US011833863B2

(12) United States Patent
Jackson

(10) Patent No.: US 11,833,863 B2
(45) Date of Patent: Dec. 5, 2023

(54) MODULAR INTEGRATED TIRE INFLATION HUB SYSTEM AND DEVICE

(71) Applicant: IRH INC, Orting, WA (US)

(72) Inventor: James Jackson, Orting, WA (US)

(73) Assignee: IRH INC, Orting, WA (US)

(*) Notice: Subject to any disclaimer, the term of this patent is extended or adjusted under 35 U.S.C. 154(b) by 340 days.

(21) Appl. No.: 17/234,623

(22) Filed: Apr. 19, 2021

(65) Prior Publication Data

US 2021/0323362 A1 Oct. 21, 2021

Related U.S. Application Data

(60) Provisional application No. 63/011,686, filed on Apr. 17, 2020.

(51) Int. Cl.
B60C 23/00 (2006.01)
B60B 27/00 (2006.01)

(52) U.S. Cl.
CPC ...... B60C 23/00345 (2020.05); B60B 27/001 (2013.01); B60B 27/0047 (2013.01); B60C 23/00336 (2020.05); B60C 23/00363 (2020.05)

(58) Field of Classification Search
CPC .............. B60B 27/001; B60B 27/0047; B60C 23/00345; B60C 23/00336; B60C 23/00363
See application file for complete search history.

(56) References Cited

U.S. PATENT DOCUMENTS

| 6,145,558 A * | 11/2000 | Schmitz ............ B60C 23/00318 152/416 |
| 10,994,576 B2 * | 5/2021 | Mancinelli ........ B60C 23/00363 |
| 2014/0035238 A1 * | 2/2014 | Richie ..................... F16J 15/166 277/559 |
| 2015/0136291 A1 * | 5/2015 | Grimm ............. B60C 23/00347 152/417 |
| 2015/0352911 A1 * | 12/2015 | Bittlingmaier ........ F16L 27/087 152/417 |

* cited by examiner

Primary Examiner — Scott A Browne
(74) Attorney, Agent, or Firm — Travis Banta; Loyal IP Law, PLLC

(57) ABSTRACT

The present disclosure relates a device that includes a rotary union body. Included with the rotary union body is a circumferential air channel, a seal channel, and an intake air channel. The intake air channel is connected to the circumferential air channel. Also disclosed is a hub assembly system that includes a hub and a rotary union body. Included with the rotary union body is a circumferential air channel, a seal channel and an intake air channel. Here the intake air channel is connected to the circumferential air channel.

16 Claims, 5 Drawing Sheets

MODULAR INTEGRATED TIRE INFLATION HUB SYSTEM AND DEVICE

BACKGROUND

The first pneumatic tires were patented in in the mid-1800s and made popular by John Dunlop. Pneumatic tires rolled easier and provided a smoother ride over uneven ground than metal, wooden, or solid rubber tires. Originally the tire included a rubber inflated tube that was covered in cloth. Later an additional rubber layer was added to cover the cloth covering increasing the longevity and durability of the tire. These new pneumatic tires lasted longer but there was a continuing push to further extend the life of the tire. To try and extend the life of an inflatable tire, cross ply tires were introduced. Cross ply tires use a series of cords that crisscrossed over each other forming a sort of frame which was again covered by a rubber outer layer. Cross ply tires enjoyed strengthened tire walls and increased the stability of the inflatable tire. Unfortunately, cross ply tires heated up quickly and were relatively rigid which reduced the comfort of a rider. In the mid-1900s radial tires took the place of cross ply tires because they allowed for easier steering, they made good contact on the road, they made a more comfortable ride because of their flexible side walls, they generate less heat on the road, they were more resistant to tread damage, and they increased fuel economy. Not long after the radial tire was invented, pneumatic tires went tubeless so that the space between the tire and the rim was no longer occupied by a tube but sealed by a bead between the tire and the rim to hold air in the tire.

The amount of air pressure inside a tire is crucial for a variety of reasons. For example, a tire with the proper amount of air increases the fuel economy of a vehicle and can extend the life of the tire and both of these create environmental efficiency by reducing waste and decreasing the carbon output by increasing fuel economy. On the other hand, the wrong amount of air pressure increases the likelihood of a blowout and could negatively affect lateral stability and steering. In certain situations, such as in technical driving applications, sometimes referred to as four wheel drive situations, tires may be deflated from suggested air pressure levels to increase grip on rocks or provide more surface area contact to "float" on sand, mud, snow, dirt, etc. Thus, inflation and deflation of a tire may be dictated by driving applications, such as high-way and off-road use.

To better monitor the air pressure of a tire, a tire pressure monitoring sensor ("TPMS") was created to give real time feedback to the driver concerning the tire pressure. This was also important because many things affect tire pressure including, a gradual leak, a change in temperature, and a change in altitude. Furthermore, a change in terrain may require different amount of tire pressure. For example, a tire functions better at lower air pressure in sand than it would on the highway.

Generally inflating a tire requires an air compressor to be connected to each tire individually while the vehicle is stationary. This means if a tire is low and needs to be refilled and the individual was equipped with a portable air compressor one would need to pull over to the side of the road to individually check and fill each tire, which can be challenging in certain situations depending on traffic and location. This is not only dangerous but impractical in many situations. The other option would be to change out a tire or try and make it to a place that has an air compressor that can inflate a tire. As a result, an "on the go" inflation system was sought. Currently there are a few different types of on the go inflation systems the most popular being one that uses an air compressor attached to the vehicle which pumps air to a rotating port either through the axle or a hose in the axle. The rotating port sits on the end of the axle and spins with the wheel from the rotating port while one or more hoses extend to the one or more tire fill valves. This system does allow for a driver to inflate his tires while driving, however, further, this system includes many components which are spinning or exposed hoses that connect to a compressor which increases the likelihood of damage to the components either from physical strain or from contact with something on a road.

Another method is a called a self-inflating tire. This inflation system uses a tube, that is either part of the tire or inserted inside the tire. The tube runs along the inside of the tire next to the rim and uses the motion of the tire to pump air into the tire as a vehicle with a tire, so equipped, drives down a road. However, because the tire inflates with motion, the tire needs to be rotating to inflate. Further, installation of such a system requires a custom tire or a retrofitted tire to function properly. Also, since the intake hole is on the wall of the tire, the self-inflating tire may fail if the tire is under water or covered in mud.

Lastly an additional type of tire inflation uses a JAMM pump to inflate the tire. When a tire is low the pump comes in contact with a rod that actuates the movement of the pump as the tire spins. Like other systems described above, the tire using a JAMM pump has to be rotating to inflate and the inflation process is dependent on that movement which is unhelpful if the tire is flat and cannot be driven safely. Further, air output from the JAMM pump is minimal, which requires significant amounts of time to produce enough air to re-inflate a tire or inflate a tire to a proper pressure.

Accordingly, a need exists for a modular hub which allows air to enter a tire from one or more ports that are disposed within the modular hub. In other words, a need exists for a system that may inflate or deflate a tire, whether or not the tire is spinning and without manual interaction with the tire, that operates without installing many exterior tubes and hoses to connect a tire to an air compressor.

SUMMARY OF THE DISCLOSURE

Disclosed below is a device that includes a rotary union body. Disposed within the rotary union body is a circumferential air channel, a seal channel and an intake air channel. The intake air channel is connected to the circumferential air channel. A seal channel is also disposed within the rotary union body. Also disclosed is a seal channel, and an intake air channel. Also disclosed is a hub assembly system that includes a hub and a rotary union body. Disposed within the rotary union body is a circumferential air channel, a seal channel and an intake air channel. The intake air channel is connected to an circumferential air channel. A seal channel is also disposed within the rotary union body.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

In the following description of the disclosure, reference is made to the accompanying drawings, which form a part hereof, and in which is shown by way of illustration specific implementations in which the disclosure is may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
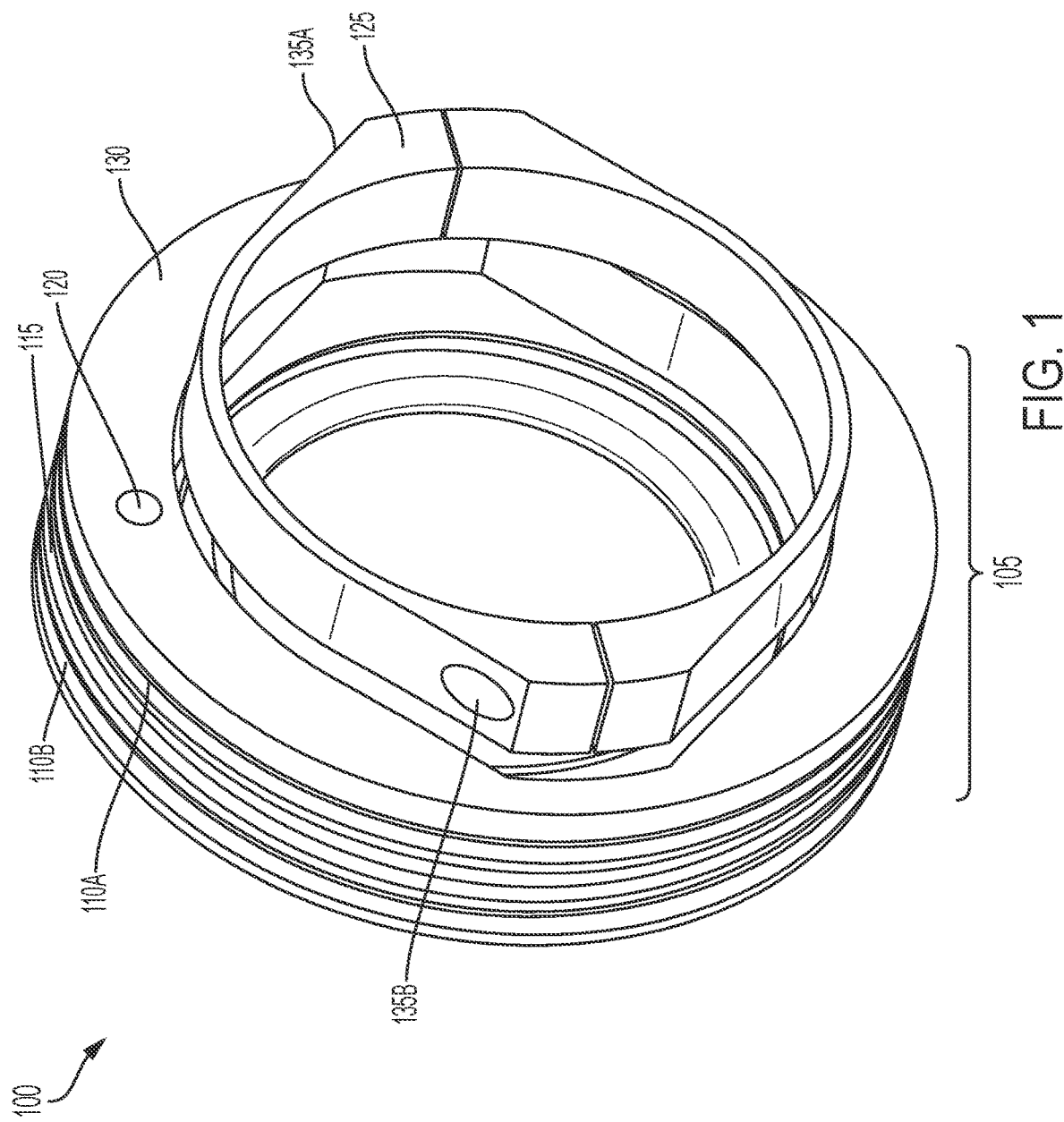
FIG. 1 illustrates an exploded view of a modular rotary union assembly of a modular integrated tire inflation hub device.

FIG. 1 illustrates an exploded view of a modular rotary union assembly 105 of a modular integrated tire inflation hub device 100. Modular rotary union assembly 105 is comprised of rotary union body 130 and lock clamp 125. Rotary union body 130 contains three channels that encircle rotary union body 130, seal channels 110A and 110B and circumferential air channel 115. As shown in FIG. 1, the two channels that occupy the space closest to the outer edge on both sides of rotary union body 130 are seal channels 110A and 110B. Seal channels 110A and 110B provide a space where a seal may be installed about the exterior circumference of rotary union body 130. The seals, not shown, are preferably a multi-lip seal or O-ring but other seals that function equivalently may also be used.

The center channel in rotary union body 130 is circumferential air channel 115. Circumferential air channel 115 is disposed in between seal channel 110A and seal channel 110B. Circumferential air channel 115 may contain at least one aperture that connects to intake air channel 120. Intake air channel 120 may have one or more openings on rotary union body 130. The first opening of intake air channel 120 may be on the face of rotary union body 130 that runs beneath and perpendicular to seal channel 110A. Another opening (not shown due to perspective) is disposed in the circumferential air channel 115. When intake air channel 120 is sealed by a seal within seal channel 110A and 110B intake air channel 120 may be pressurized to cause air to flow through intake air channel 120.

Intake air channel 120 may further connect to air supply inlet and one or more air supply outlet in a hub, as discussed below. Seal channels 110A and 110B are depicted as being of equal sizes but seal channels 110A and 110B may differ in sizes as required by specific application. Also, circumferential air channel 115 may be a different size than one or more of the seal channels 110A and or 110B. Furthermore, hub device 100 may have only one seal channel 110A or may have more than two seal channels. Further, more than one circumferential air channel 115 may be installed in rotary union body 130, as desired for differing applications. Circumferential air channel 115 and intake air channel 120 are a part of a network of channels, a portion of which may be disposed in or included within a modular integrated tire inflation hub. As a whole the modular integrated tire inflation hub is intended to be a part of a system that transfers air from an air compressor, air pump, air pump or other device to inflate or deflate directly or indirectly one or more inflatable tires that may be found on a vehicle, a vehicle trailer, tractor or other wheeled conveyance.

Recesses may be disposed within rotary union body 130 that made with ears 135A and 135B which include apertures that accommodate a bolt or another connector to securely attach lock clamp 125 to rotary union body 130 and portions of lock clamp 125 to itself. These attachments may include but are not limited to welding rivets, industrial strength adhesives, or other connectors known to one of ordinary skill in the art. Whatever attachment is used circumferential air channel 115 is sealed so that air is conveyed into intake air channel 120. Lock clamp 125 and rotary union body 130 may be made of material that can withstand the rigors of being part of a hub in a vehicle, such as aluminum or steel. Lock clamp 125 and rotary union body 130 may be made of the same or different material as seen fit by one skilled in the art. Lock clamp 125 may be keyed into rotary union body 130 via ears 135A and 135B which may be inserted into corresponding recesses within rotary union body 130 and which may also contain screw holes which allow lock clamp 125 to secure a spindle, for example, inside lock clamp 125 when screws are applied to hold two pieces of lock clamp 125 together.

Figure 2:
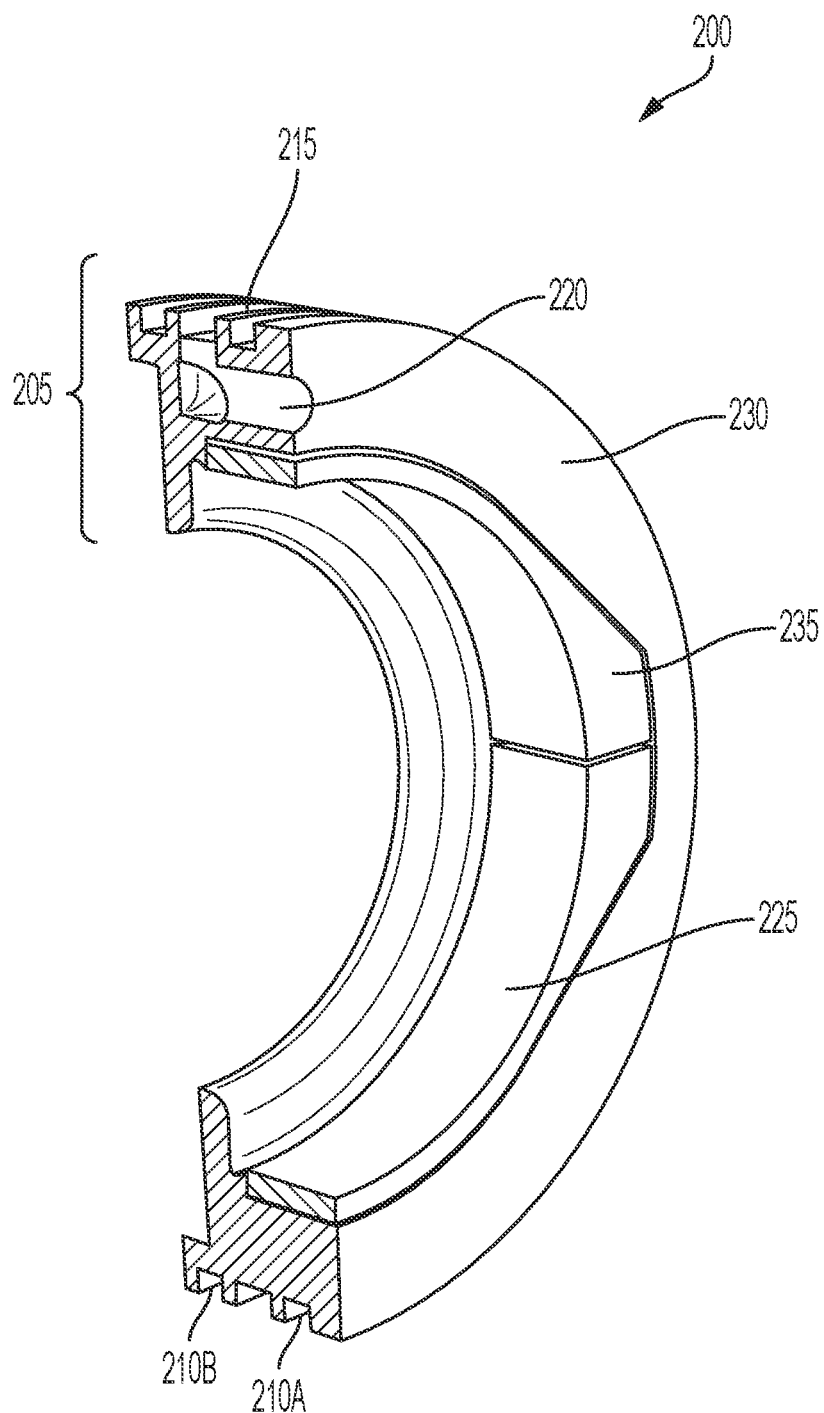
FIG. 2 illustrates a perspective view of a cross-section of a modular rotary union assembly of a modular integrated tire inflation hub device.

FIG. 2 illustrates a perspective view of a cross-section of a modular rotary union assembly 205 of a modular integrated tire inflation hub device 200. Modular rotary union assembly 205 is comprised of rotary union body 230 and lock clamp 225. Lock clamp 225, as shown in FIG. 2, is installed in rotary union body 230. Rotary union body 230 may contain three channels that encircle rotary union body 230. It is noted, however, that more or fewer channels may be implemented and each of the channels may be similar or different sizes. The two outer channels that may occupy the space closest to the outer edge of rotary union body 230 are seal channels 210A and 210B. Inside these channels a seal may be placed, which may preferably include one or more multi-lip seals or an O-ring, or equivalent. Seal channels 210A and 210B are sized to accommodate the appropriate seal.

The center channel depicted in rotary union body 230 of FIG. 2 is circumferential air channel 215. Circumferential air channel 215 may be disposed between seal channel 210A and seal channel 210B. Within circumferential air channel 215 at least one aperture that connects to intake air channel 220 may be disposed. Intake air channel 220 may have two openings on rotary union body 230. For example, a first opening may be on a face of rotary union body 230 and may run beneath seal channel 210A (e.g., within modular rotary union assembly 205) while the second opening may extend upward at substantially a 90° angle to open up to circumferential air channel 215. The angle at which intake air channel 220 connects between the first and second opening need not be 90°. So long as intake air channel 220 is able to connect between first and second openings, and not upset either of seal channels 210A/210B, intake air channel 220 may be disposed at any angle. However, in preferable examples, the angle of intake air channel 220 between the first opening and the second opening will be within 20 degrees of the aforementioned 90° angle.

Circumferential air channel 215 and the intake air channel 220 are a part of a network of channels, portion of which is included within and are part of a hub, which will be described below. As a whole the hub is intended to be a part of a system that transfers air from an air compressor, air pump, air pump or other device to inflate or deflate directly or indirectly one or more inflatable tires that may be found on a vehicle trailer, tractor or other wheeled conveyance.

Recesses may be disposed within rotary union body 230 that accommodate an ear 235 which may include apertures that accommodate a bolt or another connector to securely attach lock clamp 225 to rotary union body 230 and portions of lock clamp 225 to itself. These attachments may include but are not limited to welding rivets, industrial strength adhesives, or other connectors known to one of ordinary skill in the art. Whatever attachment is used circumferential air channel 215 is sealed so that air is conveyed into intake air channel 220. Lock clamp 225 and rotary union body 230 may be made of material that can withstand the rigors of being part of a hub in a vehicle, such as aluminum or steel. Lock clamp 225 and rotary union body 230 may be made of the same or different material as seen fit by one skilled in the art. Lock clamp 225 may be keyed into rotary union body 230 via an ear 235 which may be inserted into corresponding recesses within rotary union body 230 and which may also contain screw holes which allow lock clamp 225 to secure a spindle, for example, inside lock clamp 225 when screws are applied to hold two pieces of lock clamp 225 together.

Figure 3:
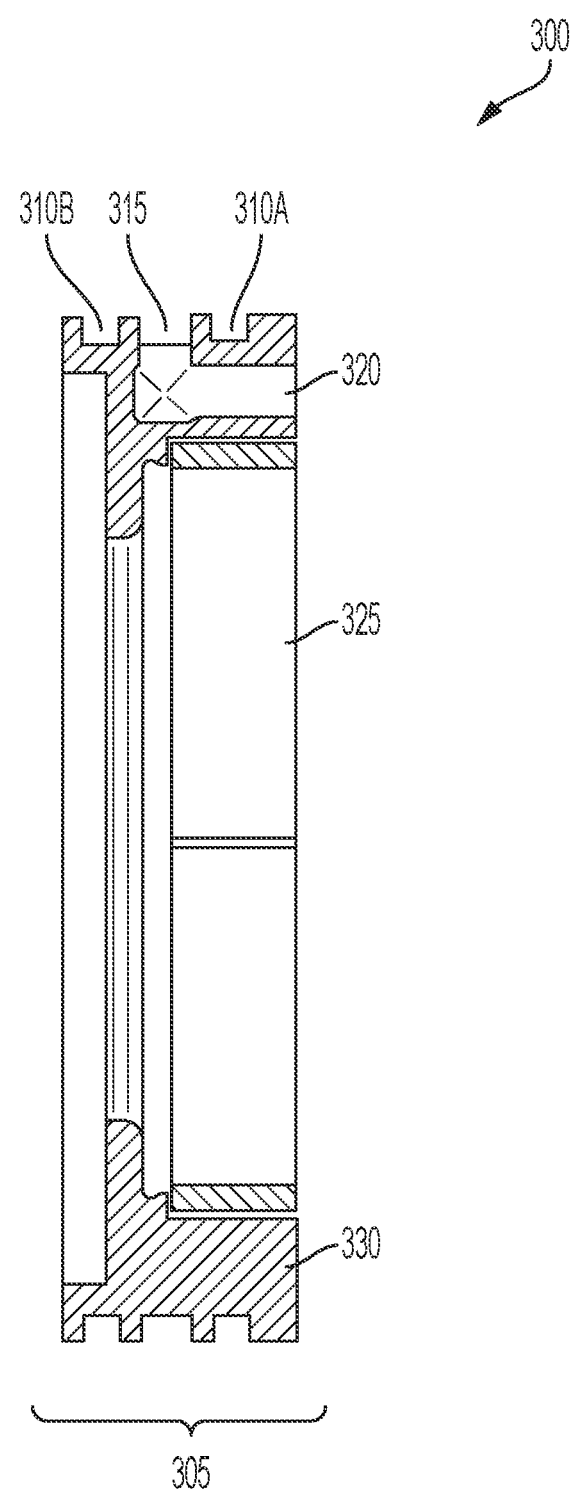
FIG. 3 illustrates a cross-section view of a modular rotary union assembly of a modular integrated tire inflation hub device.

FIG. 3 illustrates a cross-section view of a modular rotary union assembly 305 of a modular integrated tire inflation hub device 300. Rotary union body assembly 305 is comprised of rotary union body 330 and lock clamp 325. Rotary union body 330 may contain 3 channels that encircle rotary union body 330. The two outer channels that occupy the space closest to the outer edge of rotary union body 130 are seal channels 310A and 310B. Inside these channels a seal may be place preferable a multi-lip seals that circular and are continuously connected when placed inside the seal channels.

The center channel may be circumferential air channel 315. Circumferential air channel 315 may be disposed in between seal channel 310A and seal channel 310B. Within circumferential air channel 315 may contain at least one aperture that connects the air channel 320. Intake air channel 320 may include two openings on rotary union body 330 one opening on the face of the rotary union body 330 that runs beneath seal channel 310A and or 310B and then extends upward at to open up to circumferential air channel 315.

The circumferential air channel 315 and the intake air channel 320 are a part of a network of channels that a portion of which is included within and are part of a hub. As a whole the hub is intended to be a part of a system that transfers air from an air compressor, air pump, air pump or other device to inflate or deflate directly or indirectly one or more inflatable tires that may be found on a vehicle trailer, tractor or other wheeled apparatus.

Other apertures may be disposed with in circumferential air channel 315 including apertures that accommodate a bolt or another connector item to securely attach lock clamp 325 to rotary union body 330. Rotary union body 330 has an opening sized to fit lock clamp 325. The size and the shape of lock clamp 325 may vary but the opening within rotary union body 330 will be sided to fit lock clamp 325. These attachments between rotary union body 330 and lock clamp 325 may include but are not limited to welding rivets, industrial strength adhesives. Whatever attachment is used circumferential air channel 315 is sealed so that air will not likely leak out of intake air channel 320. Lock clamp 325 and rotary union body 330 may be made of material that can withstand the rigors of being part of a hub in a vehicle. Lock clamp 325 and rotary union body 330 may be made of the same or different material as seen fit by one skilled in the art.

Figure 4:
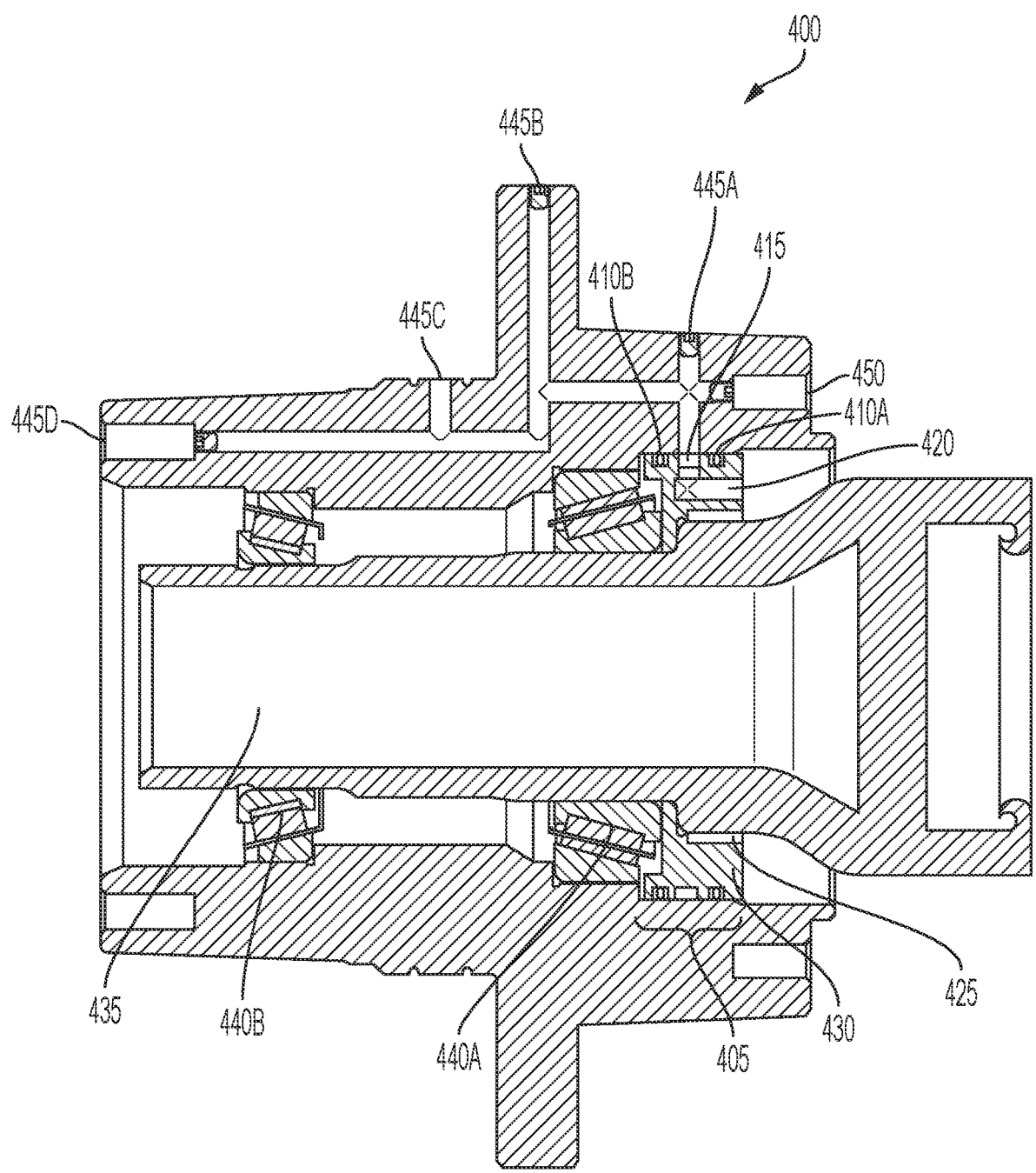
FIG. 4 illustrates a cross-section view of a full float axle hub of a modular integrated tire inflation hub system and device.

FIG. 4 illustrates a cross-section view of a full float axle hub of a modular integrated tire inflation hub system and device. Hub system and device 400 may include a modular rotary union assembly 405 that includes rotary union body 430 and lock clamp 425, which has been described above. FIG. 4 illustrates hub system and device 400 installed in a hub. Rotary union body 430 may contain three channels that encircle rotary union body 430. The two outer channels that occupy the space closest to the outer edge of rotary union body 430 may be seal channels 410A and 410B. Inside these channels a seal may be placed preferable a multi-lip seals that are circular and are continuously connected when placed inside the seal channels. The seal may also be implemented as an O-ring, or equivalent. Further, as shown in FIG. 4, rotary union body 430 and lock clamp 425 may be installed within hub system and device 400, as shown and described above.

The center channel may be circumferential air channel 415. Circumferential air channel 415 may be disposed in between seal channel 410A and seal channel 410B. Circumferential air channel 415 may further contain one or more apertures that connect circumferential air channel 415 to intake air channel 420. Intake air channel 420 may open on rotary union body 430 at two or more places. One opening may be on the face of rotary union body 430 and the channel may run beneath seal channel 410A and then extends upward to open up to circumferential air channel 415, as described above. The circumferential air channel 415 and the inlet to intake air channel 420 are a part of a network of channels, described below, which are disposed within rotary union body 430. The internal channels of the rotary union body 430 facilitate the transfer and delivery of pressurized fluid air from the inlet to intake air channel 420, and through the outer rotating wheel hub of the modular integrated tire inflation wheel hub assembly 400, to the tire of the vehicle. The fluid air pressure in the tire is adjusted and may be routed through an intermediate commercially available central tire inflation wheel valve located traditionally on the vehicle wheel assembly between vehicle tire and pneumatic supply porting at axle hub. As a whole, hub system and device 400 is intended to be a part of a system that transfers air from an air compressor, air pump, air tank or other device to inflate or deflate directly or indirectly one or more inflatable tires that may be found on a vehicle trailer, tractor or other wheeled conveyance.

Hub system and device 400 includes spindle 435 which houses the axle. Spindle 435 may also be secured inside hub system and device 400 by lock clamp 425 Spindle 435 may further contact two separate taper roller bearings 440A and 440B. Roller bearing 440A is located proximally to roller bearing 440B. Further roller bearing 440A tapers towards the hub on the distal end of the roller bearing 440A. Roller bearing 440B tapers towards rotary union body 430 on a proximal end of the roller bearing 440B.

Hub system and device 400 may include a modular rotary union assembly 405. Modular rotary union assembly 405 may be comprised of a rotary union body 430, which is fixed in a static position to the spindle 435, by a lock clamp 425, which is keyed inside of the rotary union body 430. In other words, modular rotary union assembly 405 may be disposed substantially at a first end of hub system and device 400 and open modular rotary union assembly 405 to an axle. Intake air channel 420 may receive air from another device such as an air pump, air compressor, air tank or other like devices known to those skilled in the art. As a wheel hub spins circumferential air channel 415 may open to intake air channels 420 directly or through a channel. Also, intake air channel 420 may be linked to one or more air outlets 445A-445D and right side air outlet 450. As shown in FIG. 4, air outlets, 445A, 445B, 445D and right side air outlet 450 are plugged with a threaded bolt, for example, to prevent air from escaping intake air channels 420. Air outlets 445A, 445B, and 445D 445C may be open and accept a hose which may connect to a tire valve and allow air to pass through air outlets 445A, 445B, 445D, and right side air outlet 450 through the tire valve, and into the tire (or vice versa to deflate the tire automatically). Any of air outlets 445A-445D and right side air outlet 450 may be plugged or open according to the demands of a specific application. Further, air hoses may be connected to any one of air outlets 445A-445D and right side air outlet 450 and to a tire valve, as desired to suit a particular application. Air outlet 445C may be implemented as an o-ringed implementation with an affixed hollow spoke wheel which may be used to fill a tire through the hollow spoke or internal passage bored into the wheel.

Figure 5:
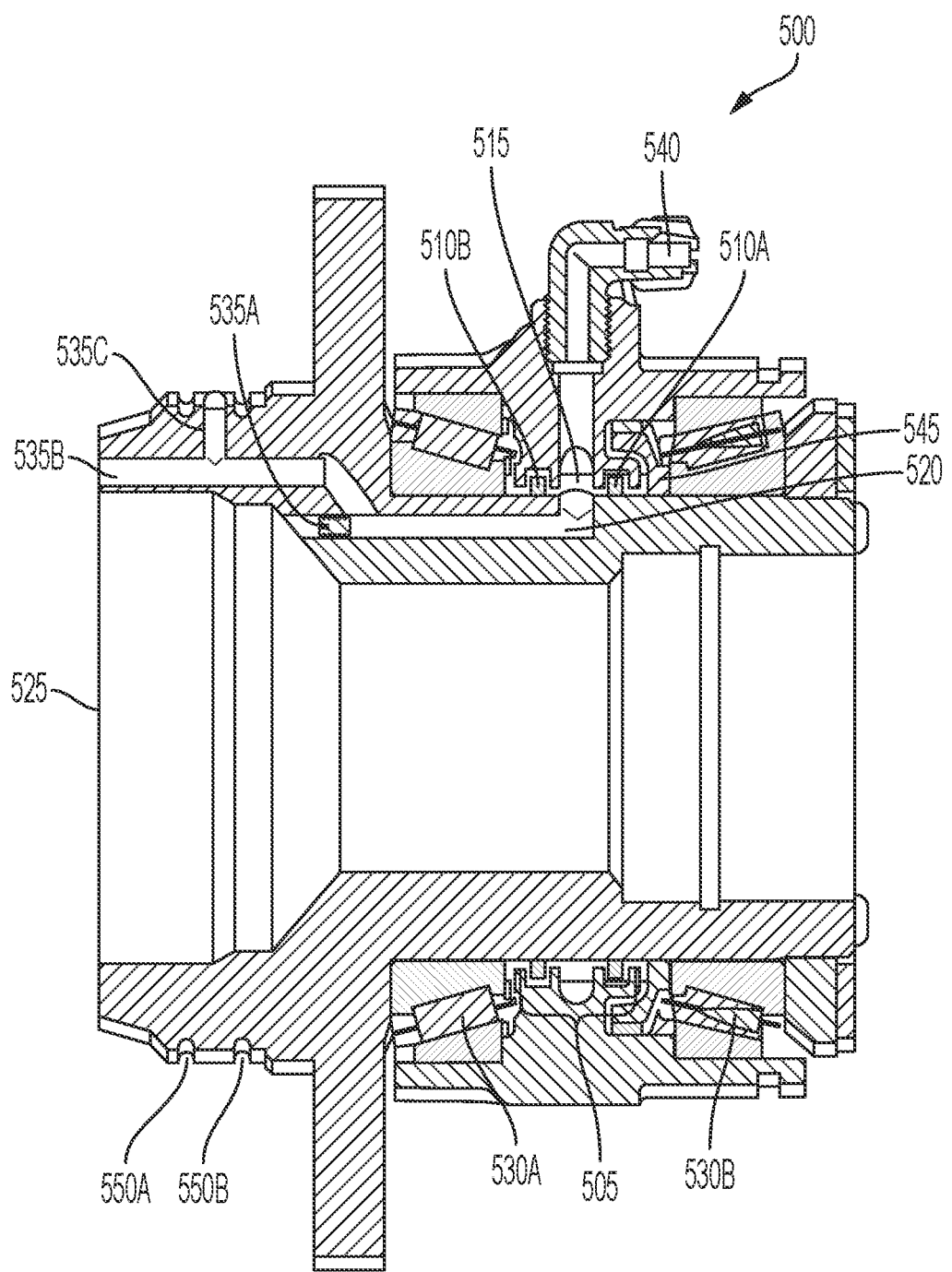
FIG. 5 illustrates a cross-section view of a unitized hub of a modular integrated tire inflation hub system and device.

FIG. 5 illustrates a cross-section view of a unitized hub of a modular integrated tire inflation hub system and device 500. Hub system and device 500 may be include a modular rotary union assembly 505 which includes a rotary union body, such as rotary union body 130, shown in FIG. 1, which is not shown in FIG. 5 due to cross-sectional perspective and a centralized unitized wheel hub, and a central unitized wheel hub constrained by opposing tapper bearings 530A and 530B.

Modular rotary union assembly 505 may contain three channels that encircle modular rotary union assembly 505. The two outer channels that occupy the space closest to the outer edge of modular rotary union assembly 505 may be seal channels 510A and 510B. Inside these channels a seal may be placed preferable a multi-lip seals that are circular and are continuously connected when placed inside the seal channels. The seals may also be implemented as an O-ring, or equivalent.

The center channel may be circumferential air channel 515. Circumferential air channel 515 may be disposed between seal channel 510A and seal channel 510B. Circumferential air channel 515 may further contain one or more apertures that connect circumferential air channel 515 to intake air channel 520. Intake air channel 520 may open on modular rotary union assembly 505 at two or more places. One opening may be on the face of modular rotary union assembly 505 and the channel may run beneath seal channel 510A and then extends upward to open up to circumferential air channel 515, as described above. The circumferential air channel 515 and the intake air channel 520 are a part of a network of channels, described below, which are disposed within a sidewall or exterior wall of a hub system and device 500. As a whole the hub system and device 500 is intended to be a part of a system that transfers air from an air compressor, air pump, air tank or other device to inflate or deflate directly or indirectly one or more inflatable tires that may be found on a vehicle trailer, tractor or other wheeled apparatus.

Wheel hub 525 contacts two separate taper roller bearings 530A and 530B. Roller bearing 530A is located proximally to roller bearing 530B. Further roller bearing 530A tapers towards the hub on the distal end of the roller bearing 530A. Roller bearing 530B tapers towards an inside edge of hub system and device 500 on a proximal end of the roller bearing 530B.

Hub system and device 500 may include a bearing disposed within modular rotary union assembly 505 (which includes a rotary union body and lock clamp which are not shown in this figure due to perspective). Modular rotary union assembly 505 is disposed between taper roller bearings 530A and 530B. Hub system and device 500 may further include circumferential air channel 515 which may be linked to air supply inlet 540. Air supply inlet 540 receives air from another device such as an air pump, air compressor, air tank or other like devices known to those skilled in the art. Air supply inlet 540 may be connected by a channel to circumferential air channel 515. As modular rotary union assembly 505 spins circumferential air channel 515 may open to air supply inlet 540 directly or through a channel. Also, air supply inlet 540 may be linked to one or more air outlets 535A-535C. As shown in FIG. 5, air outlet 535A is shown as plugged with a threaded bolt, for example, to prevent air from escaping. Air outlet 535B and or 535C may be open and accept a hose which may connect to a tire valve and allow air to pass through air outlet 535B and or 535C, through the tire valve, and into the tire (or vice versa to deflate the tire automatically). Either of air outlets 535A-535C may be plugged or open according to the demands of a specific application. Further, air hoses may be connected to any one of air outlets 535A-535C and to a tire valve, as desired to suit a particular application. Air outlet 535C may be open and accept an O-ring interface in O-ring grooves 550A and 550B that encircle either side of air outlet 535C. Air outlet 535C may connect to a tire valve and allow air to pass through or receive from a tire valve, though an internal passage bored into the spoke of the wheel.

Hub system and device 500 may further include a reluctor ring 545, which is located adjacent to modular rotary union assembly 505. Reluctor ring 545 may be fitted with sensors, magnets, or other devices which provide information to a vehicle's computer. For example, reluctor ring 545 may be used to identify the speed of a tire rotations per minute, or other information associated with hub system and device 500.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device, comprising:
   a rotary union body comprising:
   a circumferential air channel disposed around an outside edge of the rotary union body,
   an intake air channel that opens to the circumferential air channel,
   a recess disposed in the rotary union body,
   wherein the recess disposed in the rotary union body is sized to receive a lock clamp with an ear, and
   a seal channel disposed circumferentially around an outside edge of the rotary union body,
   wherein the lock clamp with the ear is keyed inside the recess disposed within the rotary union body via the ear such that the ear is received within a corresponding recess of the rotary union body.

2. The device of claim 1, wherein the seal channel is disposed to be parallel to the circumferential air channel in the rotary union body.

3. The device of claim 2, wherein the intake air channel is connected to one or more air outlets.

4. The device of claim 1 wherein the intake air channel extends perpendicularly to the circumferential air channel.

5. The device of claim 1, further comprising:
   a seal disposed in the seal channel.

6. The device of claim 5, wherein the seal is sized to occupy the seal channel that is disposed within the rotary union body.

7. The device of claim 1, further comprising:
   a second seal channel disposed within the rotary union body.

8. A hub assembly system, comprising:
   a hub;
   a rotary union body that connects to the hub comprising:
   a circumferential air channel disposed around the rotary union body,
   an intake air channel that opens to the circumferential air channel
   a recess disposed in the rotary union body,
   wherein the recess disposed in the rotary union body is sized to receive a lock clamp with an ear, and
   a seal channel disposed within the rotary union body.

9. The hub assembly system of claim 8, wherein one or more air outlets are disposed within the hub.

10. The hub assembly system of claim 9, wherein the intake air channel is connected to one or more of the one or more air outlets.

11. The hub assembly system of claim 8, further comprising:
    a lock clamp with an ear.

12. The hub assembly system of claim 11, wherein the lock clamp is disposed within the recess disposed within the rotary union body.

13. The hub assembly system of claim 8, wherein the intake air channel extends perpendicularly to the circumferential air channel around the rotary union body.

14. The hub assembly system of claim 8, further comprising:
    one or more taper roller bearings contacting the hub.

15. The hub assembly system of claim 13, wherein the one or more taper roller bearings taper in a direction towards the hub.

16. The hub assembly system of claim 13, wherein the one or more taper roller bearing taper towards the rotary union.

* * * * *